United States Patent [19]

Inoue

[11] Patent Number: 5,295,699
[45] Date of Patent: Mar. 22, 1994

[54] METAL LAMINATE GASKET WITH INNER PROJECTION CONNECTING MECHANISMS

[75] Inventor: Takashi Inoue, Tokyo, Japan

[73] Assignee: Ishikawa Gasket Co., Ltd., Tokyo, Japan

[21] Appl. No.: 5,947

[22] Filed: Jan. 19, 1993

[30] Foreign Application Priority Data

Jan. 24, 1992 [JP]  Japan .............................. 4-007381[U]

[51] Int. Cl.⁵ .......................... F02F 11/00; F16J 15/02
[52] U.S. Cl. ............................................... 277/235 B
[58] Field of Search ............... 277/9, 233, 234, 235 B, 277/231, 232

[56] References Cited

U.S. PATENT DOCUMENTS

| | | |
|---|---|---|
| 2,135,807 | 11/1938 | Fitzgerald . |
| 4,662,643 | 5/1987 | Rosenquist ...................... 277/235 B |
| 4,815,758 | 3/1989 | Yoshino .......................... 277/235 B |
| 5,022,431 | 6/1991 | Grey et al. .................. 277/235 B X |
| 5,033,189 | 7/1991 | Desverchere et al. ..... 277/235 B X |
| 5,039,117 | 8/1991 | Göhrlich et al. ............... 277/235 B |
| 5,121,933 | 6/1992 | Silvers ............................ 277/235 B |
| 5,131,668 | 7/1992 | Uchida ........................... 277/235 B |
| 5,161,809 | 11/1992 | Matsushita et al. ............ 277/235 B |
| 5,285,527 | 8/1981 | Connely ......................... 277/235 B |

FOREIGN PATENT DOCUMENTS

| | | | |
|---|---|---|---|
| 0500273 | 8/1992 | European Pat. Off. ........ 277/235 B |
| 0190736 | 11/1982 | Japan .............................. 277/235 B |
| 0190737 | 11/1982 | Japan .............................. 277/235 B |
| 0190738 | 11/1982 | Japan .............................. 277/235 B |
| 0383993 | 6/1989 | United Kingdom . | |

Primary Examiner—William A. Cuchlinski, Jr.
Assistant Examiner—John L. Beres
Attorney, Agent, or Firm—Kanesaka and Takeuchi

[57] ABSTRACT

A metal laminate gasket of the invention is basically formed of first and second metal plates, and a sealing device situated around the cylinder bores. The first plate includes first holes corresponding to the cylinder bores, an intermediate area located between the first holes, and two openings situated at the intermediate area. The second plate is situated above the first plate, and includes a second hole for locating therein the first holes and the sealing device. The second plate includes projecting areas with edges located on the intermediate area. When the first and second plates are assembled, the edges of the second plate pass through the openings of the first plate and are located at a side opposite to a side that the second plate is disposed. Thus, the edges of the second plate are fixed to or engaged with the first plate.

4 Claims, 1 Drawing Sheet

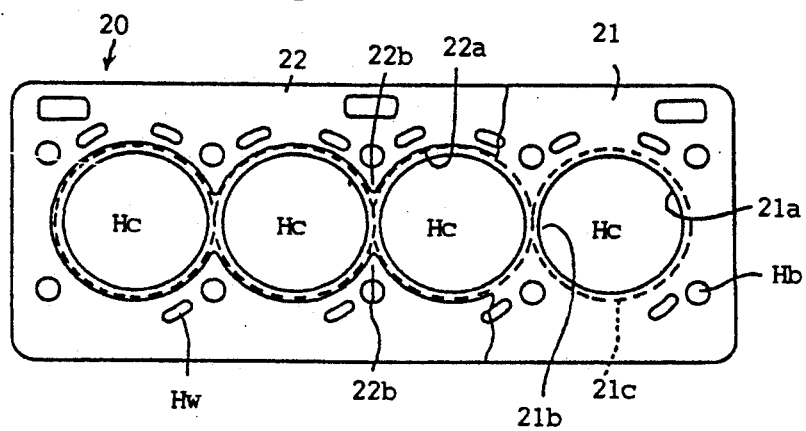
Fig. 1
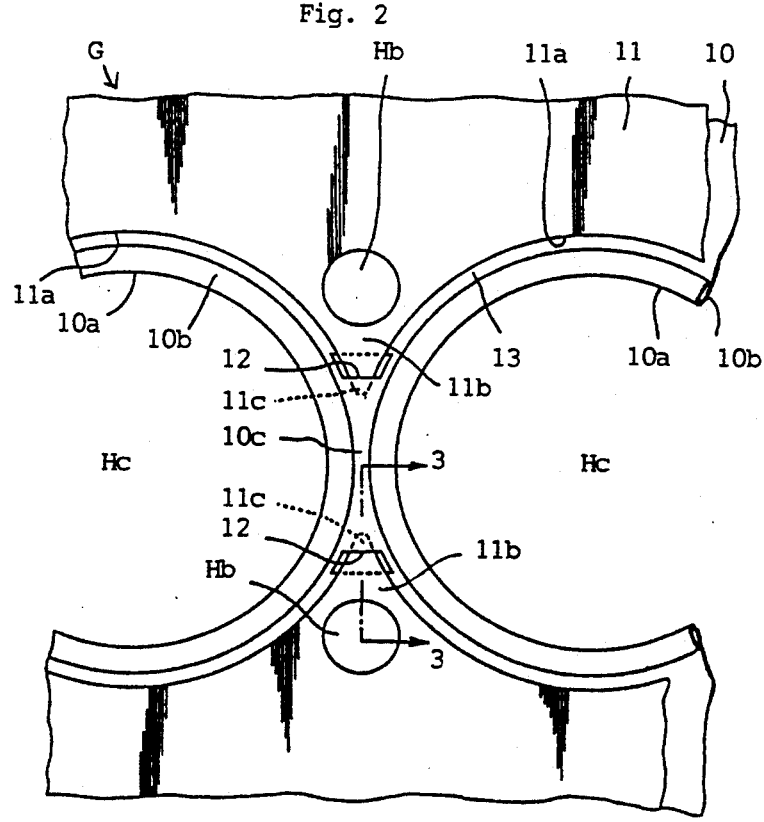
Fig. 2
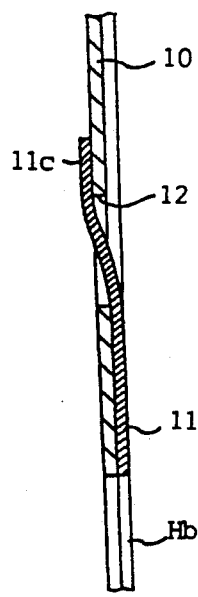
Fi. 3

METAL LAMINATE GASKET WITH INNER PROJECTION CONNECTING MECHANISMS

BACKGROUND OF THE INVENTION AND RELATED ART STATEMENT

The present invention relates to a metal laminate gasket with inner projection connecting mechanisms for securely connecting inner projections of a metal plate to a different metal plate.

In an internal combustion engine, a plurality of metal plates is laminated together to constitute a metal laminate gasket. In case sealing means for sealing around a hole is formed on one metal plate, another metal plate laminating over the one metal plate may not overlap the sealing means (hereinafter called non-overlapping type gasket). Thus, excessive surface pressure is not formed on the sealing means when the gasket is tightened.

In an old engine, the distances between the cylinder bores are spaced apart relatively widely. Thus, even if the above non-overlapping type gasket is prepared, the metal plates may simply have holes for the cylinder bores.

However, lately, engines have been developed to have light weight and high power, so that the distances between the cylinder bores become narrow. Consequently, one of the metal plates in the non-overlapping type gasket can not have independent holes.

As shown in FIG. 1, for example, a gasket 20 is formed of plates 21, 22 laminated together. The plate 21 includes holes for cylinder bores Hc, edges 21a of the holes, an intermediate areas 21b between the holes, and sealing means 21c around the edges 21a. The plate 22 includes one continuous hole with an edge 22a to be situated outside the sealing means 21c, and projections 22b projecting toward the intermediate areas 21b. Namely, the plate 22 does not have independent holes for surrounding the cylinder bores and includes one hole with the projections 22b.

In this engine, since the projections 22b are simply located in the intermediate areas 21b and are not properly connected to the plate 21, in case outer force is applied to the projections, the projections may deform or may be separated from the plate 21.

Accordingly, one object of the invention is to provide a metal laminate gasket, wherein inner projections of one metal plate are securely connected to another metal plate.

Another object of the invention is to provide a metal laminate gasket as stated above, wherein the projections of the metal plate can be easily assembled with another metal plate without deformation.

A further object of the invention is to provide a metal laminate gasket as stated above, which can be easily and economically manufactured.

Further objects and advantages of the invention will be apparent from the following description of the invention.

SUMMARY OF THE INVENTION

A metal laminate gasket of the invention is used for an internal combustion engine having at least two cylinder bores. The gasket is basically formed of a first metal plate, sealing means for sealing around the cylinder bores, and a second metal plate situated over the first plate.

The first plate extends substantially throughout an entire area of the engine. The first plate includes at least two first holes corresponding to the cylinder bores of the engine, and an intermediate area located between the adjacent two first holes. The first plate further includes two openings or slits situated in the intermediate area. The openings face against each other relative to an imaginary line linking between centers of the first holes.

In the invention, the sealing means is formed around the first holes of the first plate. When the gasket is tightened, the sealing means is compressed and seals around the first holes.

The second plate situated on the first plate includes one second hole having an inner edge or configuration, which substantially corresponds to parts of inner configurations of the cylinder bores and is larger than the first holes. The second hole has a narrow area situated on the intermediate area of the first plate. Thus, the second plate includes projecting areas with edges, which are located outside the narrow area and situated in the intermediate area.

When the first and second metal plates are assembled together, the edges pass through the openings of the first plate and are located at a side opposite to a side that the second plate is generally disposed. Thus, the edges of the projecting areas are fixed to the intermediate area of the first plate.

In this respect, if the edges are not fixed to or engaged with the first plate, the projecting areas may be deformed by outer force applied thereto, or may be separated from the other plate, which may cause leakage of fluid from the cylinder bores or water holes.

In the invention, however, the projecting areas with the edges formed on the second plate are engaged with the first plate, so that the deformation or separation of the projecting areas is prevented. Thus, fluid leakage is prevented.

Preferably, the sealing means is integrally formed with the first plate, and includes a curved portion and a flange situated near the first hole. The second hole is made greater than the sealing means so that the second plate does not laminate the sealing means.

BRIEF DESCRIPTION OF THE DRAWINGS

FIG. 1 is a plan view of a conventional metal laminate gasket;

FIG. 2 is an enlarged plan view of a part of a metal laminate gasket of the invention; and FIG. 3 is an enlarged section view taken along a line 3—3 in FIG. 2.

DETAILED DESCRIPTION OF PREFERRED EMBODIMENT

Referring to FIGS. 2 and 3, a gasket G of the present invention is shown. The gasket G includes a plurality of cylinder bores Hc, water holes Hw (not shown), bolt holes Hb, and oil holes Ho (not shown) as in the conventional gasket shown in FIG. 1.

The gasket G is formed of a lower plate 10, and an upper plate 11 situated above the lower plate 10. The plates 10, 11 substantially extend throughout the entire area of engine parts to be sealed.

The lower plate 10 includes curved portions 10a to define the cylinder bores Hc, and flanges 10b extending from the curved portions 10a in the directions away from the cylinder bores Hc. The curved portion 10a and the flange 10b constitute sealing means for the gasket G.

The lower plate 10 further includes an intermediate area 10c between the adjacent cylinder bores Hc. The intermediate area 10c is provided with holes 12 in addition to bolt holes Hb. The holes 12 are located symmetrically relative to an imaginary line (not shown) linking between the centers of the cylinder bores Hc.

The upper plate 11 includes a hole 13 having an inner edge 11a, which is larger than the cylinder bores Hc but substantially corresponds to parts of the cylinder bores Hc. Namely, the inner edge 11a surrounds outside the flanges 10b of the lower plate 10.

Since the intermediate area 10c of the lower plate 10 is narrow, the edge 11a of the upper plate 11 does not completely surround the respective cylinder bores Hc or flanges 10b. Thus, the upper plate 11 includes projecting areas 11b located above the intermediate area 10c of the lower plate 10. The projecting areas 11b have edges 11c, between which a narrow space is defined.

When the gasket G is assembled, the projecting areas 11b are located above the intermediate area 10c of the lower plate 10. Also, the edges 11c are inserted into the holes 12 of the lower plate 10 and are disposed on a side of the lower plate 10 opposite to a side that the plate 11 is located.

When the gasket G is tightened between the engine parts, i.e. a cylinder block and a cylinder head (both not shown), parts of the intermediate area 10c above the edges 11c slightly deform or are pushed upwardly by the edges 11c. However, it does not affect sealing ability of the gasket G. The edges 11c are securely fixed to the intermediate area 10c of the lower plate 10.

Thus, when the gasket G is used, the edges 11c are not accidentally deformed by outer forces applied from the cylinder head and the cylinder block. Further, even if pressure to the intermediate area is suddenly released, the edges 11c do not separate from the lower plate 10. Thus, leakage due to deformation or separation of the edges is surely prevented.

Although the gasket G is formed of two plates, it is possible to form a gasket by further laminating metal plates. Also, the plates 10, 11 may be further connected together at other portions by spot welding or other method.

In the present invention, inner edges of one metal plate of a gasket can be securely and easily connected to the other metal plate. The connection can be made without using special tools or steps.

While the invention has been explained with reference to the specific embodiment of the invention, the explanation is illustrative, and the invention is limited only by the appended claims.

What is claimed is:

1. A metal laminate gasket for an internal combustion engine having at least two cylinder bores, comprising:
   a first metal plate extending substantially throughout an entire area of the engine and including at least two first holes corresponding to the cylinder bores of the engine, an intermediate area located between the two first holes, and two openings situated in the intermediate area and facing against each other relative to an imaginary line linking between centers of the first holes,
   sealing means formed around the first holes of the first metal plate for sealing therearound, and
   a second metal plate situated on the first metal plate and having one second hole, said second hole having an inner configuration corresponding to parts of inner configurations of the cylinder bores and larger than the first holes and a narrow area situated on the intermediate area of the first plate, said second plate having projecting areas with edges located outside the narrow area and situated in the intermediate area, said edges, when the first and second metal plates are assembled, passing through the openings of the first plate and located at a side opposite to a side that the second plate is disposed so that the edges of the second plate are fixed to the intermediate area of the first plate.

2. A metal laminate gasket according to claim 1, wherein said sealing means is integrally formed with the first metal plate, said second hole being greater than the sealing means so that the second plate does not laminate the sealing means.

3. A metal laminate gasket according to claim 2, wherein each sealing means includes a curved portion extending from the first plate to define the first hole, and a flange extending from the curved portion in a direction away from the first hole and situated over the first plate.

4. A metal laminate gasket according to claim 2, wherein said openings and edges are located symmetrically to the imaginary line linking between the centers of the first holes.

* * * * *